(12) United States Patent
Crowley et al.

(10) Patent No.: US 12,131,324 B2
(45) Date of Patent: Oct. 29, 2024

(54) STORAGE SYSTEMS TO PERFORM DATA VALIDATION IN BLOCKCHAINS

(71) Applicant: Dell Products L.P., Round Rock, TX (US)

(72) Inventors: Owen Crowley, Carrigaline (IE); Peniel Charles, Bangalore (IN); Manikandan Sethuraman, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 164 days.

(21) Appl. No.: 17/971,736

(22) Filed: Oct. 24, 2022

(65) Prior Publication Data

US 2024/0135375 A1   Apr. 25, 2024
US 2024/0232878 A9   Jul. 11, 2024

(51) Int. Cl.
*G06Q 20/40*     (2012.01)
(52) U.S. Cl.
CPC ....... *G06Q 20/401* (2013.01); *G06Q 2220/00* (2013.01)
(58) Field of Classification Search
CPC .................................................... G06Q 20/401
USPC ......................................................... 707/703
See application file for complete search history.

(56) References Cited

U.S. PATENT DOCUMENTS 10,540,652 B2 *   1/2020   Saur ..................... G06Q 20/223
10,637,659 B1 *   4/2020   Li ............................ G06F 21/64
2018/0343111 A1 * 11/2018   Chen ................... G06Q 20/0655
2020/0364188 A1 * 11/2020   Hintermeister ....... G06F 16/122
2022/0150070 A1 *  5/2022   Nath ..................... G06F 11/3055
2022/0150072 A1 *  5/2022   Jacob ...................... G06F 21/64

OTHER PUBLICATIONS

C. Gorenflo et al., "FastFabric: Scaling Hyperledger Fabric to 20,000 Transactions per Second," International Journal of Network Management, arXiv:1901.00910v2, Mar. 4, 2019, 9 pages.
Denys, "How the Consortium Blockchain Works," https://blockchain.intellectsoft.net/blog/how-the-consortium-blockchain-works/, Sep. 25, 2019, 14 pages.
A. Banerjee, "Everything You Need to Know About Consortium Blockchain," https://www.blockchain-council.org/blockchain/everything-you-need-to-know-about-consortium-blockchain/, Accessed Sep. 2, 2022, 10 pages.
Deloitte Development LLC, "So, You've Decided to Join a Blockchain Consortium," Aug. 2019, 4 pages.

(Continued)

*Primary Examiner* — Muluemebet Gurmu
(74) *Attorney, Agent, or Firm* — Ryan, Mason & Lewis, LLP

(57) ABSTRACT

A method comprises receiving at one or more cloud storage nodes a data block to be validated in connection with adding the data block to a digital ledger. The data block is received from a party storage node corresponding to a party of a plurality of parties that are members of a blockchain computing environment. The party storage node executes a first portion of a validation operation for the data block. The one or more cloud storage nodes execute a second portion of the validation operation for the data block. In the method, the data block is added to the digital ledger responsive to validating the data block, and at least a portion of the digital ledger is stored in the one or more cloud storage nodes.

20 Claims, 6 Drawing Sheets

(56) References Cited

OTHER PUBLICATIONS

Statista, "Worldwide Spending on Blockchain Solutions from 2017 to 2024," https://www.statista.com/statistics/800426/worldwide-blockchain-solutions-spending/, May 23, 2022, 2 pages.
B. Lutkevich, "Cryptographic Nonce," https://www.techtarget.com/searchsecurity/definition/nonce#:~:text=A, Accessed Sep. 25, 2022, 4 pages.
G. Lawton et al., "Smart contract," https://www.techtarget.com/searchcio/definition/smart-contract, Accessed Sep. 27, 2022, 9 pages.
Gr0kchain, "Calculating the Merkle Root for a Block," https://bitcoindev.network/calculating-the-merkle-root-for-a-block/, Accessed Oct. 19, 2022, 15 pages.

\* cited by examiner

STORAGE SYSTEMS TO PERFORM DATA VALIDATION IN BLOCKCHAINS

FIELD

The field relates generally to information processing systems, and more particularly to data validation in blockchains.

BACKGROUND

A blockchain is a digital ledger of transactions which requires that new transactions be validated before they are added to the digital ledger. Public or open blockchains comprise a decentralized computer network of computing resources or computing nodes (or simply, nodes) and are generally accessible to any node having a connection to the Internet. Private blockchains are centrally controlled and provide limited access to authorized nodes. Public blockchains can be found in, for example, digital currency networks and private blockchains are typically found in a corporate or other enterprise environment.

A consortium blockchain is a hybrid of a public blockchain and a private blockchain. Similar to a private blockchain, participants in a consortium blockchain tend to be members of a pre-approved group of nodes on a network, thereby providing a greater degree of control, fault tolerance and security over the network than a public blockchain.

SUMMARY

Illustrative embodiments provide techniques for using storage systems to validate blockchain transactions.

In one embodiment, a method comprises receiving at one or more cloud storage nodes a data block to be validated in connection with adding the data block to a digital ledger. The data block is received from a party storage node corresponding to a party of a plurality of parties that are members of a blockchain computing environment. The party storage node executes a first portion of a validation operation for the data block. The one or more cloud storage nodes execute a second portion of the validation operation for the data block. In the method, the data block is added to the digital ledger responsive to validating the data block, and at least a portion of the digital ledger is stored in the one or more cloud storage nodes.

These and other illustrative embodiments include, without limitation, methods, apparatus, networks, systems and processor-readable storage media.

DETAILED DESCRIPTION

Figure 1:
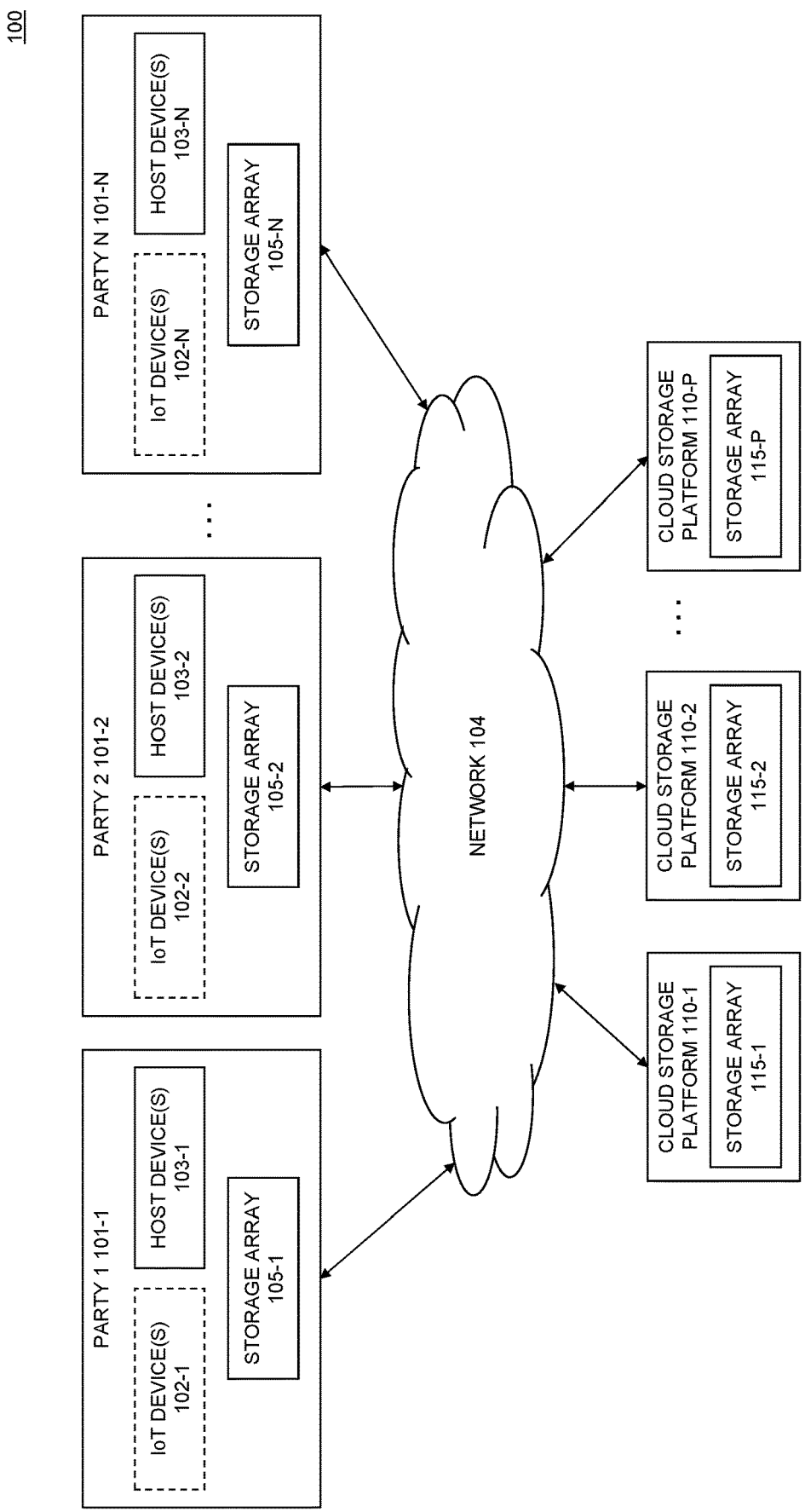
FIG. 1 depicts details of an information processing system in which cloud storage systems are used to validate blockchain transactions according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

Designated nodes in a consortium or private blockchain are pre-authorized to verify the legitimacy of blockchain transactions. Given a requirement of a majority consensus among nodes to validate a transaction, a higher number of validating nodes results in a more secure validation process. However, the increase in security limits the transactional processing ability of the blockchain.

In edge computing and especially Internet-of-Things (IoT) blockchain environments, there is a tendency to use the computing power of edge devices to increase the number of validating nodes and, therefore, increase the level of security of the blockchain. However, there are varying computational processing abilities of IoT devices. Devices with low processing ability increase the amount of time required to validate and transmit a block, which can increase latency of a system.

In a private blockchain under the control of a single enterprise, the issue of varying computational processing abilities may be controlled by ensuring that all validating nodes are of equal processing capability. However, when the blockchain stretches across multiple organizations, a common device specification is difficult to enforce, and a single "weak-link" can negatively impact the performance of the blockchain.

Conventional approaches have utilized specialized software, such as the open-source Hyperledger Fabric, to improve blockchain performance. However, there are limitations with these approaches. For example, published articles report stretched goals targeting 20,000 validated transactions per second (TPS) for blockchains configured with such specialized software. The 20,000 TPS is significantly less than the 100,000 TPS that may be required by e-commerce and banking environments.

In order to address the limitations of conventional approaches, illustrative embodiments provide technical solutions to utilize the processing power of high performance (e.g., Tier-0) cloud storage arrays to augment the transaction throughput in consortium blockchains that span multiple organizations. A consortium blockchain is an environment in which only authorized users are allowed to join the network. As a result, security is inherent within the system.

FIG. 1 shows an information processing system 100 configured in accordance with an illustrative embodiment. The information processing system 100 comprises a plurality of parties, party 1 101-1, party 2 101-2, . . . party N 101-N (collectively "collectively parties 101"). The parties represent, for example, different enterprises, organizations or other entities which may be participants of a consortium blockchain computing environment. Each of the parties 101 comprise one or more host devices 103-1, 103-2, . . . , 103-N (collectively "host devices 103") and at least one storage array 105-1, 105-2, . . . , 105-N (collectively "storage arrays 105"). Respective parties may each optionally include one or more IoT devices 102-1, 102-2, . . . , 102-N (collectively "IoT devices 102"). Since a party does not necessarily include IoT devices 102, the IoT devices 102 are depicted with dotted lines.

The IoT devices 102, host devices 103 and storage arrays 105 of respective ones of the parties 101 are connected to a network 104 and may communicate over the network 104 with one or more cloud storage platforms 110-1, 110-2, . . . , 110-P (collectively, "cloud storage platforms 110"). Each of the cloud storage platforms 110 comprise at least one storage array 115-1, 115-2, . . . , 115-P (collectively "storage arrays 115"). As explained in more detail in connection with the storage arrays 205 and 215 in FIG. 2, which may be the same as or similar to the storage arrays 105 and 115, respectively, the storage arrays 105 and 115 comprise respective sets of storage devices coupled to respective storage controllers.

The host devices 103 can comprise, for example, desktop, laptop or tablet computers, mobile telephones, or other types of processing devices capable of communicating with the cloud storage platforms 110, other host devices 103 and the storage arrays 105 over the network 104, over another network or through direct wired connections. The IoT devices 102, host devices 103 and storage arrays 105 and 115 are examples of what are more generally referred to herein as "processing devices." Some of these processing devices are also generally referred to herein as "computers." The IoT devices 102, host devices 103 and storage arrays 105 and 115 may also or alternately comprise virtualized computing resources, such as virtual machines (VMs), containers, etc. The IoT devices 102, host devices 103 and storage arrays 105 and 115 in some embodiments comprise respective computers associated with a particular company, organization or other enterprise. The variables N and P and other similar index variables herein such as K, L and M are assumed to be arbitrary positive integers greater than or equal to one.

The terms "client," "customer," "administrator" or "user" herein are intended to be broadly construed so as to encompass numerous arrangements of human, hardware, software or firmware entities, as well as combinations of such entities. Users may, for example, refer to customers, clients and/or administrators of a blockchain computing environments for which data validation is being performed. At least a portion of the available services and functionalities provided by the storage arrays 105 and the cloud storage platforms 110 including the storage arrays 115, in some embodiments, may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the IoT devices 102, host devices 103 and storage arrays 105 and 115, as well as to support communication between the IoT devices 102, host devices 103 and storage arrays 105 and 115 and connected devices and/or other related systems and devices not explicitly shown.

The cloud storage platforms 110 include, for example, Dell® EMC® Elastic Cloud Storage (ECS), Microsoft® Azure®, Amazon® S3, Google® and/or IBM® Cloud Object Storage (COS) platforms, or other available cloud infrastructures. The cloud storage platforms 110 in the present embodiment are assumed to be accessible to the parties 101, and vice-versa, over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

As used herein, the terms "distributed ledger," "blockchain," "digital ledger," and the like, may be used interchangeably. A public blockchain or public distributed ledger protocol is implemented via a distributed, decentralized computer network of computing resources or computing nodes (or simply, nodes). The nodes are operatively coupled in a peer-to-peer communications protocol. In the computer network, each node is configured to participate in the digital ledger protocol and maintain a blockchain which is a cryptographically secured data structure, record or ledger of data blocks that represent transactions associated with respective elements and/or operations within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and a block may include a timestamp, current transaction data, and information linking it to a previous block. More particularly, as described in more detail in connection with FIG. 3, each subsequent block in the blockchain is a data block that includes a given transaction(s) and a hash value of the previous block in the chain, i.e., the previous transaction. Each block can therefore be representative of a group of transactions. Thus, advantageously, each data block in the blockchain represents a given set of transaction data plus a set of all previous transaction data. In digital ledger technologies such as blockchain, an underlying consensus algorithm is typically used to validate new transactions before they are added to the digital ledger. For example, the new transaction is broadcast to all or a subset of nodes within the network, inspected, and formally committed to the blockchain when a consensus among the nodes is reached that the entry is valid.

A key principle of the blockchain is that it is trusted. That is, it is critical to know that data in the blockchain has not been tampered with by any of the compute nodes in the network (or any other node or party). For this reason, a cryptographic hash function is used. Each resulting hash value is unique such that if one item of data in the blockchain is altered, the hash value changes. It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, Hyperledger, and the like, may be employed, at least in part, in illustrative embodiments.

As noted above, when the blockchain stretches across multiple organizations such as, for example, in a consortium blockchain, a common device specification for computational processing ability is difficult to enforce and weaker computational processing abilities of one or more nodes can negatively impact the performance of the blockchain. In order to address these limitations, illustrative embodiments provide techniques in which the processing power of storage arrays is used to augment transaction throughput in consortium blockchains that span multiple organizations (e.g., multi-party consortium blockchains).

Figure 2:
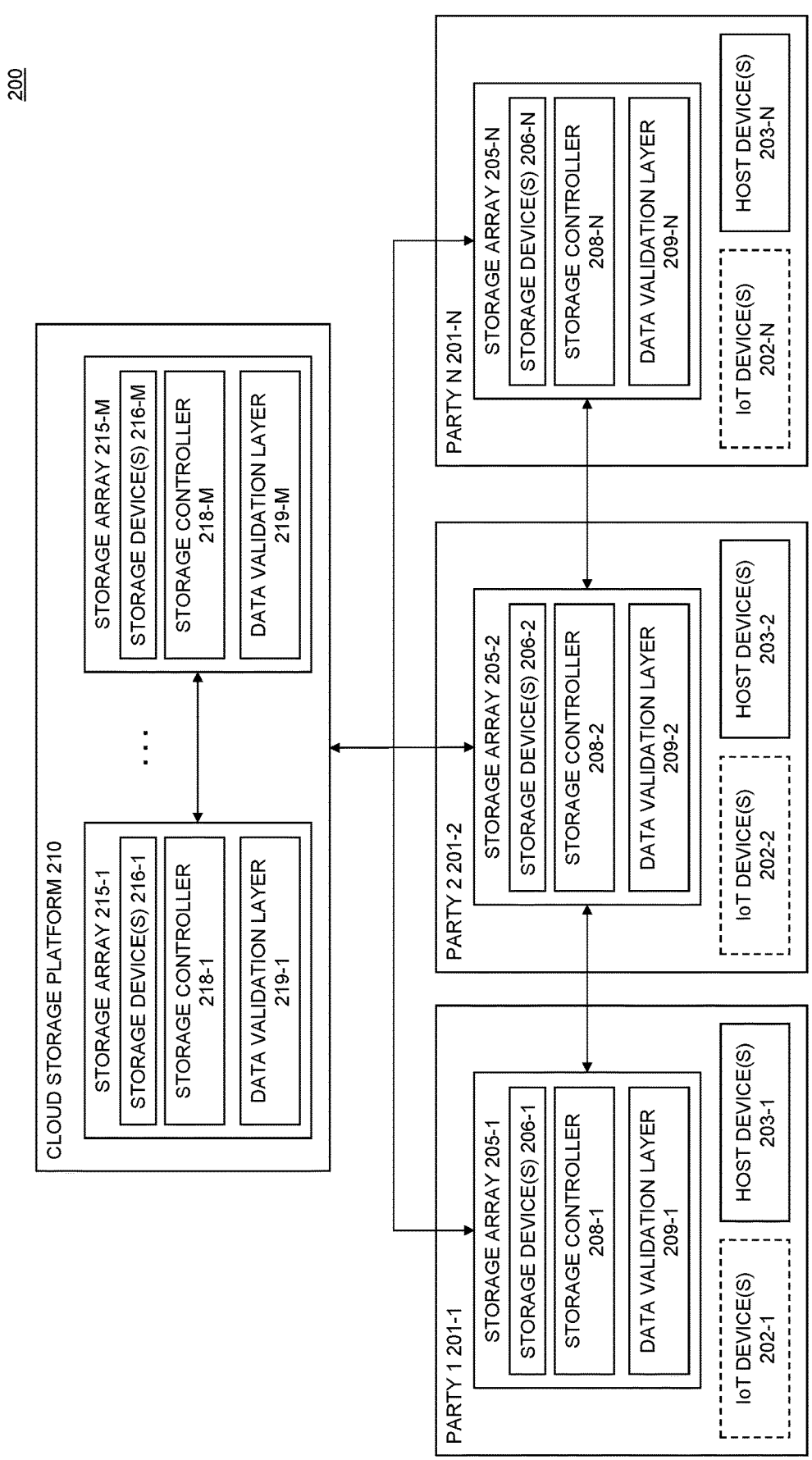
FIG. 2 depicts a blockchain computing environment in which storage arrays are used in connection with validating blockchain data and transactions according to an illustrative embodiment.

For example, FIG. 2 illustrates a multi-party consortium blockchain computing environment 200 in which storage arrays are used in connection with validating blockchain data and transactions. Similar to FIG. 1, the multi-party consortium blockchain computing environment 200 comprises a plurality of parties, party 1 201-1, party 2 201-2, ... party N 201-N (collectively "collectively parties 201"). Like the parties 101, the parties represent, for example, different enterprises, organizations or other entities which may be participants of the multi-party consortium blockchain computing environment 200. Each of the parties 201 comprise one or more host devices 203-1, 203-2, ..., 203-N (collectively "host devices 203") and at least one storage array 205-1, 205-2, ..., 205-N (collectively "storage arrays 205"). Respective parties may each optionally include one or more IoT devices 202-1, 202-2, ..., 202-N (collectively "IoT devices 202"). Since a party does not necessarily include IoT devices 202, the IoT devices IoT are depicted with dotted lines. The IoT devices 202, host devices 203 and storage arrays 205 are the same or similar to the IoT devices 102, host devices 103 and storage arrays 105 discussed in connection with FIG. 1.

Each of the storage arrays 205 comprises one or more storage devices 206-1, 206-2, ..., 206-N (collectively "storage devices 206"), one or more storage controllers 208-1, 208-2, ..., 208-N (collectively "storage controllers 208") and a data validation layer 209-1, 209-2, ..., 209-N (collectively "data validation layers 209"). The storage arrays 205 are connected via, for example, a network (e.g., network 104) to a cloud storage platform 210. The cloud storage platform comprises one or more storage arrays 215-1, ..., 215-M, which are the same or similar to the storage arrays 115. Each of the storage arrays 215 comprises one or more storage devices 216-1, ..., 216-M (collectively "storage devices 216"), one or more storage controllers 218-1, ..., 218-M (collectively "storage controllers 218") and a data validation layer 219-1, ..., 219-M (collectively "data validation layers 219"). Each of the storage devices 206 and 216 may comprise one or more logical volumes, which may comprise one or more logical partitions. As used herein, the term "logical volume" is intended to be broadly construed to refer to an identifiable unit of data storage. For example, a logical volume can refer to a named logical area of a physical disk. A logical volume may also span multiple disks, while appearing as a single, contiguous storage volume in an operating system. Partitions may represent divisions of a logical volume. Logical volumes may be identified by, for example, logical unit numbers (LUNs).

The multi-party consortium blockchain computing environment 200 spans N parties (e.g., enterprises, organizations or other entities). The storage arrays 205 and 215 comprise nodes of the multi-party consortium blockchain computing environment 200 and are responsible for validating data blocks to be added to a blockchain. The storage arrays 205 and 215 are pre-authorized nodes that are allowed to perform data block validation. In illustrative embodiments, the storage arrays 205 comprise on-site storage arrays of the parties 201 and are configured to communicate with the cloud storage arrays 215 over one or more networks in order to perform validation operations. According to illustrative embodiments, the storage arrays 205, more particularly, the data validation layers 209, perform a first portion of a validation operation for each data block to be added to the digital ledger and the storage arrays 215, more particularly the data validation layers 219, perform a second portion of a validation operation for each data block to be added to the digital ledger. The first portion of the validation operation includes analyzing data block headers to ensure that all required fields are included in the data block headers. For example, the required fields may include a timestamp identifying when the data block was created, nonce number (number used only once) identifying the particular data block, a hash value of the previous block in the chain and a Merkle root, which is generated by hashing together transaction identifiers identifying transactions on the blockchain. The Merkle root provides a unique fingerprint for all the transactions in a block.

Figure 3:
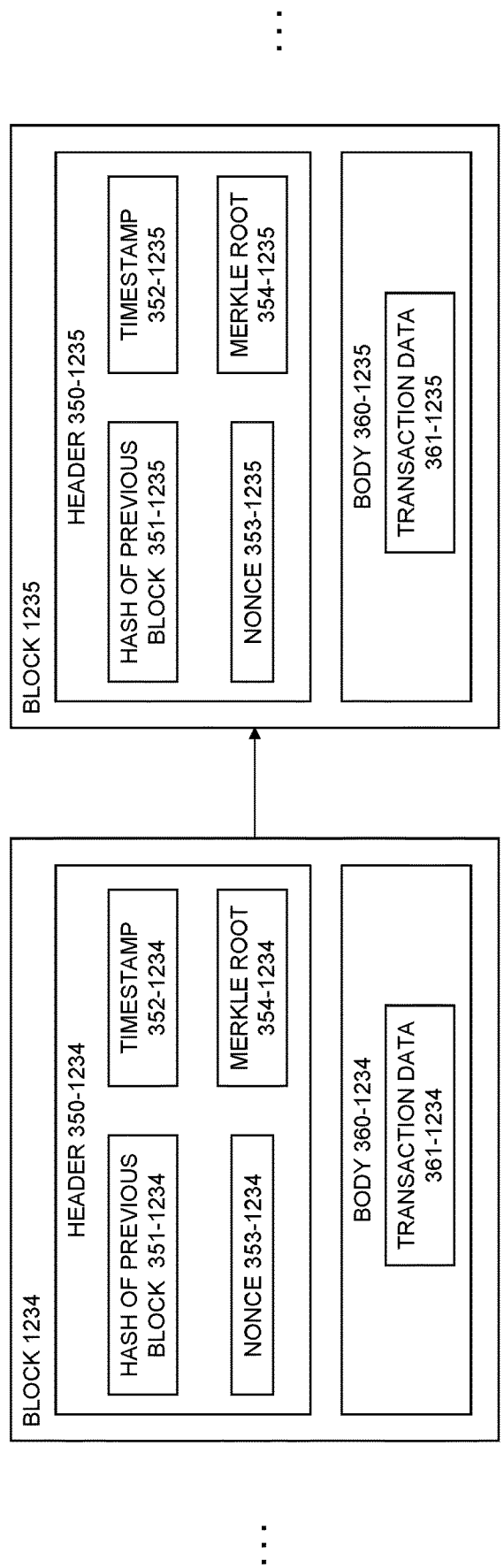
FIG. 3 depicts example blocks of a blockchain according to an illustrative embodiment.

FIG. 3 illustrates two sequential blocks (block 1234 and block 1235) of a blockchain. As can be seen each block includes a header 350-1234 and 350-1235 including a hash value of the previous block 351-1234 and 351-1235. For example, the hash value of the previous block 351-1234 for block 1234 is the hash value of block 1233, and the hash value of the previous block 351-1235 for block 1235 is the hash value of block 1234. As noted herein above, a cryptographic hash function takes an input and returns a fixed-size alphanumeric string, which is called the hash value. Each block includes information linking it to a previous block (i.e., the hash value of the previous block). In the illustrative embodiments, each header 350-1234 and 350-1235 further includes a timestamp 352-1234 and 352-1235, a nonce 353-1234 and 353-1235 and a Merkle root 354-1234 and 354-1235. The nonces 353-1234 and 353-1235 can be, for example, random or semi-random numbers having values that vary with time.

In addition to analyzing data block headers (e.g., headers 350-1234 and 350-1235) to ensure that all required fields are included in the data block headers, the storage arrays 205 also identify whether there are any issues with the contents of the one or more fields. For example, the storage arrays 205 determine whether there are any errors in or duplications between blocks of, for example, the hash values, timestamps, nonces and/or Merkle roots.

Responsive to confirming by the data validation layers 209 that all required fields are included in a data block header and that there are no issues with the contents of the fields (e.g., passing the first portion of the validation operation), the storage arrays 205 send the data block to the storage arrays 215 to perform the second portion of the validation operation. An underlying consensus algorithm is typically used to validate new transactions before they are added to the digital ledger. For example, one or more new transactions are broadcast to the storage arrays 205 of the multiple parties 201 within the multi-party consortium blockchain computing environment 200 in the form a new data block. In accordance with illustrative embodiments, edge devices such as, for example, the IoT devices 202 and host devices 203 are configured to collect new transaction data and pass the new transaction data in the form of data blocks to the storage arrays 205. When a consensus among the storage arrays 205 is reached that the first portion of the validation operation has passed (e.g., all required fields are included in a data block header and no issues with the contents of the fields), the storage arrays 205 send the data block to the storage arrays 215 to perform the second portion of the validation operation.

The second portion of the validation operation includes analyzing transaction data in a body of the data block to identify one or more issues with the transaction data. For example, the storage arrays 215 determine whether there are any errors and/or inconsistencies with information in the body of the data block. As can be seen in FIG. 3, in addition to the headers 350-1234 and 350-1235, each data block 1234 and 1235 includes a body 360-1234 and 360-1235 including transaction data 361-1234 and 361-1235. The storage arrays 215 may, for example, verify whether the transaction data in the body of a data block is correct by comparing the data from other available data sources or databases (e.g., databases or data stored within storage devices 206 and 216 of the storage arrays 205 and 215, and/or databases or data from external sources accessible to the storage arrays 205 and 215) with the transaction data in the body of a data block to determine if there any inconsistencies or errors in the compared data. Additionally, the storage arrays 215 may, for example, verify whether the transaction data in the body of a data block is correct by analyzing the transaction data within a data block to determine if there are any errors or inconsistencies within the data block itself.

In connection with performing the second portion of the validation operation, the storage arrays additionally or alternatively, analyzes the transaction data in a body of the data block to determine whether the transaction data complies with one or more constraints of the multi-party consortium blockchain computing environment 200. In a non-limiting illustrative example, the constraints may specify, for example, that each address has a postal code and/or each commercial transaction has a value greater than 0.

The executing of the second portion of the validation operation is performed using one or more smart contracts, which include rules and/or protocols that can be defined for each individual environment and executed by the storage arrays 215 against the data within that environment. In more detail, a smart contract is an application that executes logic to exchange data, deliver services and/or unlock protected content. In illustrative embodiments, the smart contracts are stored as part of the multi-party consortium blockchain computing environment 200. The smart contracts programmatically execute logic in response to designated conditions. The logic performs various tasks, processes or transactions that have been programmed into the smart contracts such as, for example, analyzing transaction data in the body of the data block to identify one or more issues with the transaction data and/or to determine whether the transaction data complies with one or more constraints of the multi-party consortium blockchain computing environment 200. In some embodiments, the smart contract is executed on a special-purpose VM that is a component of the multi-party consortium blockchain computing environment 200.

Responsive to completion of the second portion of the validation operation for a data block and finding no issues with the transaction data and/or determining compliance of the transaction data with one or more constraints of the multi-party consortium blockchain computing environment 200, the data block is encrypted and added to the digital ledger by one or more of the storage arrays 215 and the digital ledger is stored in one or more of the storage arrays 215. In illustrative embodiments, the second portion of the validation operation is performed by a plurality of storage arrays 215 daisy-chained together in the cloud storage platform 210 for increased processing ability, or by a single storage array 215 in the cloud storage platform 210. It is also to be understood, that the second portion of the validation operation can be performed by multiple storage arrays 215 spread across multiple cloud storage platforms. When multiple storage arrays 215 are used, the data block is determined to have been validated when there is a consensus among the storage arrays 215 that the second portion of the validation operation has passed (e.g., no issues with the transaction data and/or compliance of the transaction data with one or more constraints of the multi-party consortium blockchain computing environment 200 are found).

In illustrative embodiments, the storage arrays 205 and/or 215 are responsible for the operational functionality of the multi-party consortium blockchain computing environment 200. For example, the storage arrays 205 and/or 215 are configured to authorize one or more additional storage nodes to be added to the multi-party consortium blockchain computing environment 200 to perform validation functions. In addition, according to one or more embodiments, the storage arrays 205 and/or 215 are also configured to define an access level for respective ones of the one or more additional storage nodes added to the multi-party consortium blockchain computing environment 200. Access level may include, for example, read-only access, read-write access, etc. The storage arrays 105, 115, 205 and 215 in some embodiments are implemented using one or more storage systems or devices associated with a platform such as, for example, the cloud storage platforms 110 or 210. In some embodiments, one or more of the storage systems comprise a scale-out all-flash content addressable storage array or other type of storage array. Similarly, the storage arrays 105, 115, 205 and 215 described herein may comprise scale-out all-flash content addressable storage arrays or other type of storage arrays.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the parties 101 or 201, or of the cloud storage platforms 110 or 210, the storage arrays 105, 115, 205 and 215 in other embodiments can be implemented at least in part externally to the parties 101 or 201, or the cloud storage platforms 110 or 210, for example, as stand-alone servers, sets of servers or other types of systems coupled to the network 104.

The storage arrays 105, 115, 205 and 215 and other components of the parties 101 and 201, and the cloud storage platforms 110 and 210 in the FIGS. 1 and 2 embodiments are each assumed to be implemented using at least one processing device. Each such processing device generally comprises at least one processor and an associated memory, and implements one or more functional modules for controlling certain features of, for example, the storage arrays 105, 115, 205 and 215, such as for example, the data validation layers 209 and 219.

At least portions of the cloud storage platforms 110 and 210, the parties 101 and 201 and the components thereof may be implemented at least in part in the form of software that is stored in memory and executed by a processor. The cloud storage platforms 110 and 210, the parties 101 and 201 and the components thereof comprise further hardware and software required for running the components thereof, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the storage arrays 105, 115, 205 and 215 and other components of the cloud storage platforms 110 and 210 and the parties 101 and 201 in the present embodiment are shown as part of the cloud storage platforms 110 and 210 and the parties 101 and 201, at least a portion of the storage arrays 105, 115, 205 and 215 and other components of the cloud storage platforms 110 and 210 and the parties 101 and 201 in other embodiments may be implemented on one or more other processing platforms that are accessible to the cloud storage platforms 110 and 210 and the parties 101 and 201 over one or more networks. Such components can each be implemented at least in part within another system element or at least in part utilizing one or more stand-alone components coupled to the network 104.

It is assumed that the cloud storage platforms 110 and 210 in the FIGS. 1 and 2 embodiments and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, at least portions of the storage arrays 105, 115, 205 and 215 and other components of the cloud storage platforms 110 and 210 and the parties 101 and 201 can each be implemented in the form of one or more LXCs running on one or more VMs. Other arrangements of one or more processing devices of a processing platform can be used to implement the storage arrays 105, 115, 205 and 215 and other components of the cloud storage platforms 110 and 210 and the parties 101 and 201. Other portions of the system 100 and multi-party consortium blockchain computing environment 200 can similarly be implemented using one or more processing devices of at least one processing platform.

Distributed implementations of the system 100 and environment are possible, in which certain components of the system reside in a first geographic location while other components of the system and environment reside in one or more other geographic locations that are potentially remote from the first geographic location.

It is to be appreciated that these and other features of illustrative embodiments are presented by way of example only, and should not be construed as limiting in any way. Accordingly, different numbers, types and arrangements of components such as the storage arrays 105, 115, 205 and 215 and other components of the cloud storage platforms 110 and 210 and the parties 101 and 201 can be used in other embodiments. It should be understood that the particular sets of modules and other components implemented in the system 100 and environment as illustrated in FIGS. 1 and 2 are presented by way of example only. In other embodiments, only subsets of these components, or additional or alternative sets of components, may be used, and such components may exhibit alternative functionality and configurations.

Figure 4:
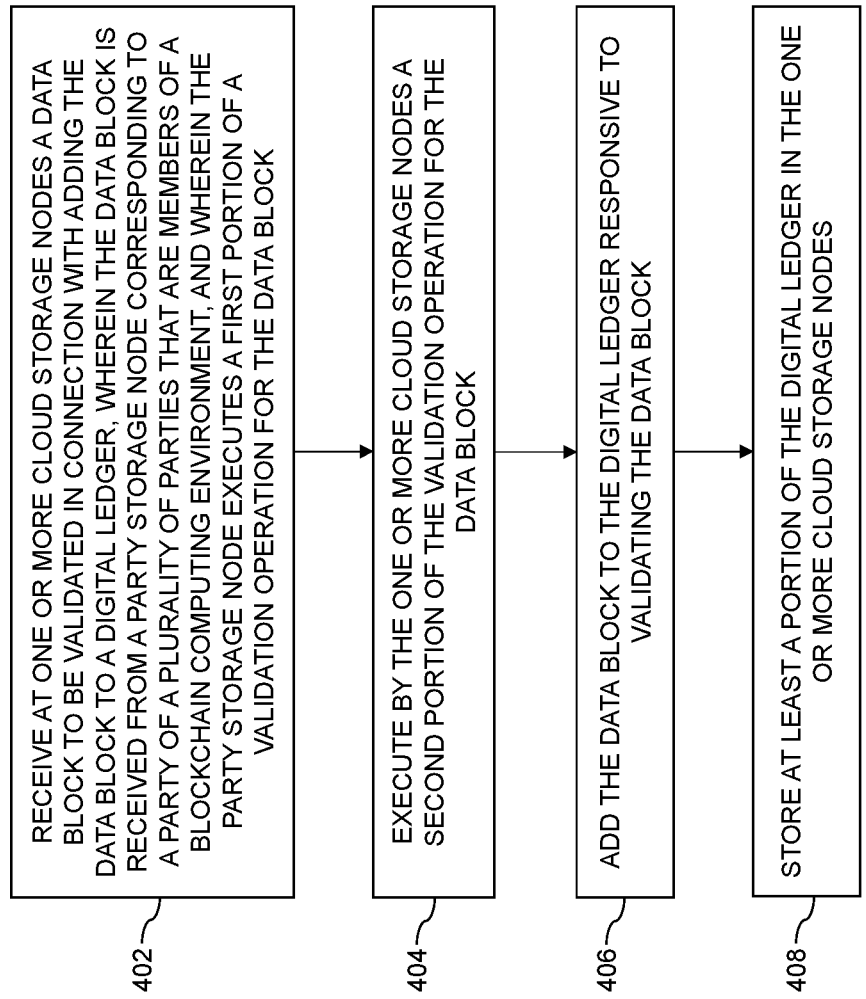
FIG. 4 depicts a process for using storage arrays to validate blockchain transactions according to an illustrative embodiment.

The operation of the information processing system 100 and multi-party consortium blockchain computing environment 200 will now be described in further detail with reference to the flow diagram of FIG. 4. With reference to FIG. 4, a process 400 for using storage arrays to validate blockchain transactions as shown includes steps 402 through 408, and is suitable for use in the system 100 or multi-party consortium blockchain computing environment 200 but is more generally applicable to other types of information processing systems and environments configured for using storage arrays to validate blockchain transactions.

In step 402, a data block to be validated in connection with adding the data block to a digital ledger is received at one or more cloud storage nodes. The data block is received from a party storage node corresponding to a party of a plurality of parties that are members of a blockchain computing environment. According to illustrative embodiments, the blockchain computing environment comprises a multi-party consortium blockchain computing environment.

The party storage node executes a first portion of a validation operation for the data block. The first portion of the validation operation comprises determining whether a header of the data block includes one or more fields, wherein the one or more fields comprise at least one of a timestamp, a nonce number, a hash value of a previous data block in the digital ledger and a Merkle root. The first portion of the validation operation further comprises identifying whether there are any issues with the contents of the one or more fields. The party storage node sends the data block to the one or more cloud storage nodes responsive to passing the first portion of the validation operation.

In step 404, the one or more cloud storage nodes execute a second portion of the validation operation for the data block. The second portion of the validation operation comprises analyzing transaction data in a body of the data block to identify one or more issues with the transaction data, and to determine whether the transaction data complies with one or more constraints of the blockchain computing environment. The executing of the second portion of the validation operation can be performed using one or more smart contracts.

In step 406, the data block is added to the digital ledger responsive to validating the data block, and in step 408, at least a portion of the digital ledger is stored in the one or more cloud storage nodes. In some embodiments, the entire digital ledger can be stored in the one or more cloud storage nodes. The one or more cloud storage nodes are configured to encrypt the data block responsive to validating the data block.

In one or more embodiments, the one or more cloud storage nodes and/or the party storage node are configured to authorize one or more additional storage nodes to be added to the blockchain environment, and to define an access level for respective ones of the one or more additional storage nodes added to the blockchain environment.

In illustrative embodiments, in a consensus operation, respective ones of a plurality of party storage nodes in addition to the party storage node and corresponding to additional parties of the plurality of parties execute the first portion of the validation operation for the data block. Data for the data block is collected by one or more edge devices and the data block is sent to the party storage node from the one or more edge devices.

It is to be appreciated that the FIG. 4 process and other features and functionality described above can be adapted for use with other types of information systems and environments configured to execute blockchain transaction validation services in a cloud storage platform or other type of platform.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems and environments as disclosed herein can provide a number of significant advantages relative to conventional arrangements. For example, unlike conventional techniques, the embodiments advantageously limit party storage arrays (e.g., storage arrays 105 and 205), which may be on-site storage arrays, to performing preliminary data validation checks of the data block headers (e.g., the first portion of the validation operation). As a result, the blockchain related computational processing requirements of party storage arrays are minimized, leaving the processing capabilities of the party storage arrays (which may constitute a majority of the processing nodes in a blockchain computing environment) free to be used by other applications. In addition, by being classified as validating nodes, the party storage arrays still add to the security of the blockchain without having the burden of performing full validation operations.

Unlike current approaches, once the preliminary validation checks are complete, the data blocks are passed to cloud storage environments, where transaction data validation checks of the transaction data in a body of the data blocks are carried out using the higher processing power of cloud storage arrays (e.g., Tier-0 storage arrays). Having successfully completed the checks, the data blocks are encrypted for security purposes and the modifications are made to the blockchain. As an additional feature, in illustrative embodiments, the blockchain data blocks are exclusively stored on the cloud storage arrays. This approach removes the data storage burden from the party (e.g., on-site) storage arrays, while also minimizing the impact if the party storage arrays are compromised by unauthorized users.

As an additional advantage, edge devices such as, for example, the IoT devices and host devices are tasked with collecting data and passing the data to the party storage nodes, thereby limiting latency issues when making modifications to the blockchain. These edge devices can request data from cloud storage as required.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 and multi-party consortium blockchain computing environment 200 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise a cloud infrastructure including virtual machines and/or container sets implemented using a virtualization infrastructure that runs on a physical infrastructure. The cloud infrastructure further comprises sets of applications running on respective ones of the virtual machines and/or container sets.

Illustrative embodiments of processing platforms will now be described in greater detail with reference to FIGS. 5 and 6. Although described in the context of system 100 and multi-party consortium blockchain computing environment 200, these platforms may also be used to implement at least portions of other information processing systems and environments in other embodiments.

Figure 5:
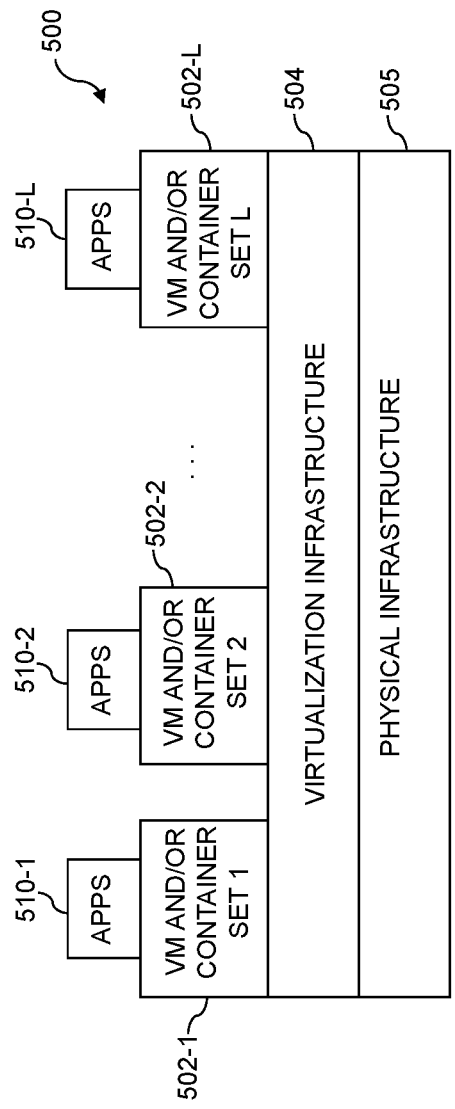
FIGS. 5 and 6 show examples of processing platforms that may be utilized to implement at least a portion of an information processing system according to illustrative embodiments.
Figure 6:
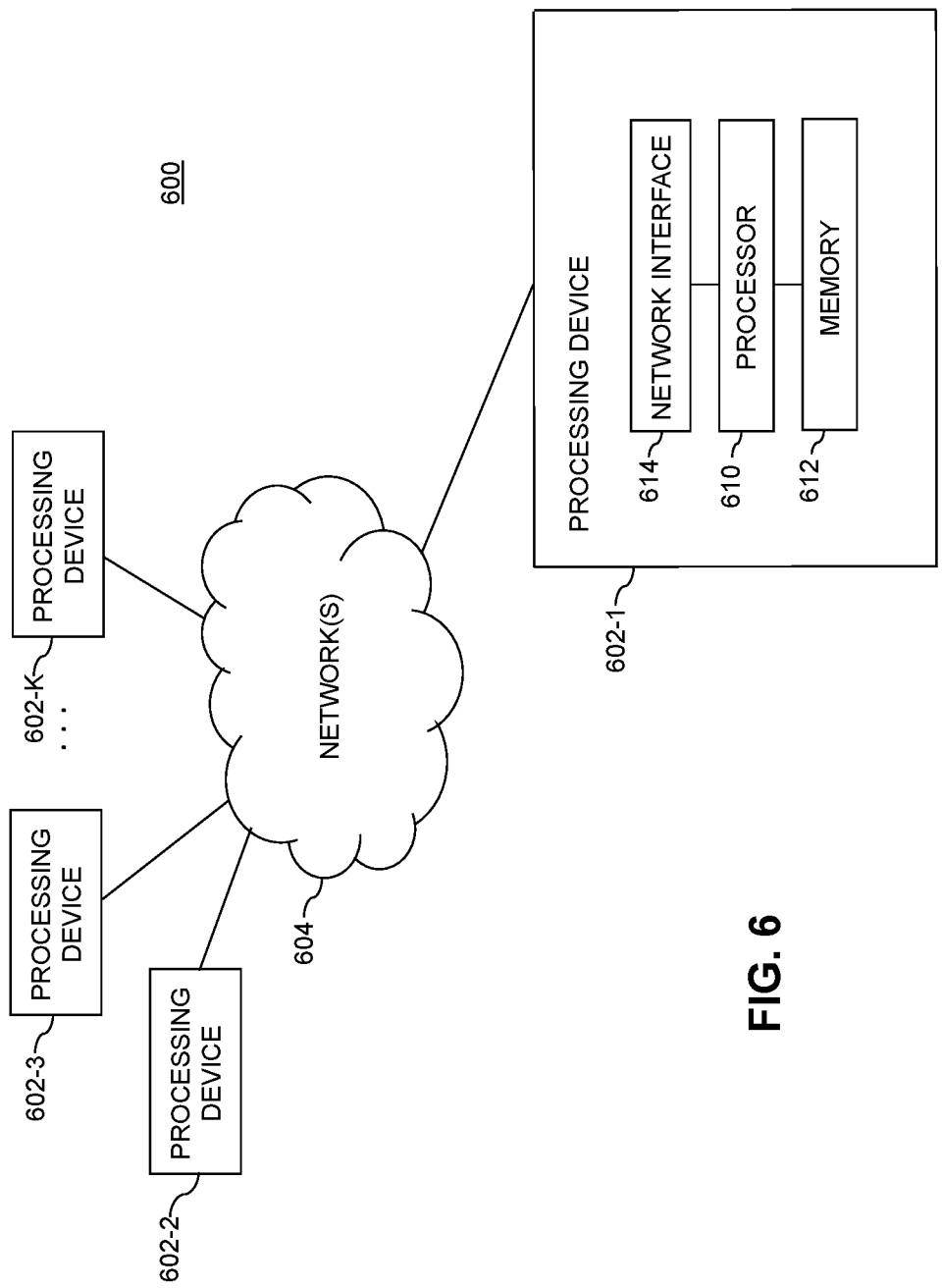

FIG. 5 shows an example processing platform comprising cloud infrastructure 500. The cloud infrastructure 500 comprises a combination of physical and virtual processing resources that may be utilized to implement at least a portion of the information processing system 100 or multi-party consortium blockchain computing environment 200. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 or multi-party consortium blockchain computing environment 200 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 or multi-party consortium blockchain computing environment 200 and includes a plurality of processing devices, denoted 602-1, 602-2, 602-3, . . . 602-P, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 or multi-party consortium blockchain computing environment 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system or blockchain computing environment as disclosed herein can be implemented at least in part in the form of one or more software programs stored in memory and executed by a processor of a processing device. For example, at least portions of the functionality of one or more components of the cloud storage platforms 110 and 210 and the parties 101 and 201 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and cloud storage operation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising at least one processor coupled to a memory;
   said at least one processing platform being configured:
   to receive at a cloud storage node, a data block to be validated in connection with adding the data block to a digital ledger;
   wherein the data block is received from a party storage node corresponding to a party of a plurality of parties that are members of a blockchain computing environment, wherein the party storage node executes a first portion of a validation operation for the data block, and wherein the party storage node is one of a plurality of party storage nodes executing the first portion of the validation operation;
   to execute by the cloud storage node a second portion of the validation operation for the data block, wherein the cloud storage node is one of a plurality of cloud storage nodes executing the second portion of the validation operation;
   to add the data block to the digital ledger responsive to validating the data block; and
   to store at least a portion of the digital ledger in the cloud storage node;
   wherein the data block is validated in response to a first consensus among the plurality of party storage nodes that the first portion of the validation operation has passed, and a second consensus among the plurality of cloud storage nodes that the second portion of the validation operation has passed.

2. The apparatus of claim 1 wherein the first portion of the validation operation comprises determining whether a header of the data block includes one or more fields.

3. The apparatus of claim 2 wherein the one or more fields comprise at least one of a timestamp, a nonce number, a hash value of a previous data block in the digital ledger and a Merkle root.

4. The apparatus of claim 2 wherein the first portion of the validation operation further comprises identifying whether there are any issues with contents of the one or more fields.

5. The apparatus of claim 1 wherein, in executing the second portion of the validation operation, said at least one processing platform is configured to analyze transaction data in a body of the data block to identify one or more issues with the transaction data.

6. The apparatus of claim 1 wherein, in executing the second portion of the validation operation, said at least one processing platform is configured to analyze transaction data in a body of the data block to determine whether the transaction data complies with one or more constraints of the blockchain computing environment.

7. The apparatus of claim 1 wherein the executing of the second portion of the validation operation is performed using one or more smart contracts.

8. The apparatus of claim 1 wherein the party storage node sends the data block to the cloud storage node responsive to the passing of the first portion of the validation operation.

9. The apparatus of claim 1 wherein at least one of the plurality of cloud storage nodes and the plurality of party storage nodes are configured to authorize one or more additional storage nodes to be added to the blockchain computing environment.

10. The apparatus of claim 9 wherein the at least one of the plurality of cloud storage nodes and the plurality of party storage nodes are configured to define an access level for respective ones of the one or more additional storage nodes added to the blockchain computing environment.

11. The apparatus of claim 1 wherein the blockchain computing environment comprises a multi-party consortium blockchain computing environment.

12. The apparatus of claim 1 wherein at least one of the plurality of cloud storage nodes is configured to encrypt the data block responsive to the validating of the data block.

13. The apparatus of claim 1 wherein data for the data block is collected by one or more edge devices and the data block is sent to the party storage node from the one or more edge devices.

14. A method comprising:
    receiving at a cloud storage node, a data block to be validated in connection with adding the data block to a digital ledger;
    wherein the data block is received from a party storage node corresponding to a party of a plurality of parties that are members of a blockchain computing environment, wherein the party storage node executes a first portion of a validation operation for the data block, and wherein the party storage node is one of a plurality of party storage nodes executing the first portion of the validation operation;
    executing by the cloud storage node a second portion of the validation operation for the data block, wherein the cloud storage node is one of a plurality of cloud storage nodes executing the second portion of the validation operation;
    adding the data block to the digital ledger responsive to validating the data block; and
    storing at least a portion of the digital ledger in the cloud storage node;
    wherein the data block is validated in response to a first consensus among the plurality of party storage nodes that the first portion of the validation operation has passed, and a second consensus among the plurality of cloud storage nodes that the second portion of the validation operation has passed;

wherein the method is performed by at least one processing platform comprising at least one processor coupled to a memory.

15. The method of claim 14 wherein the first portion of the validation operation comprises determining whether a header of the data block includes one or more fields.

16. The method of claim 14 wherein executing the second portion of the validation operation comprises analyzing transaction data in a body of the data block to identify one or more issues with the transaction data.

17. A computer program product comprising a non-transitory processor-readable storage medium having stored therein program code of one or more software programs, wherein the program code when executed by at least one processing platform causes the at least one processing platform:

to receive at a cloud storage node, a data block to be validated in connection with adding the data block to a digital ledger;

wherein the data block is received from a party storage node corresponding to a party of a plurality of parties that are members of a blockchain computing environment, wherein the party storage node executes a first portion of a validation operation for the data block, and wherein the party storage node is one of a plurality of party storage nodes executing the first portion of the validation operation;

to execute by the cloud storage node a second portion of the validation operation for the data block, wherein the cloud storage node is one of a plurality of cloud storage nodes executing the second portion of the validation operation;

to add the data block to the digital ledger responsive to validating the data block; and to store at least a portion of the digital ledger in the cloud storage node;

wherein the data block is validated in response to a first consensus among the plurality of party storage nodes that the first portion of the validation operation has passed, and a second consensus among the plurality of cloud storage nodes that the second portion of the validation operation has passed.

18. The computer program product according to claim 17 wherein the first portion of the validation operation comprises determining whether a header of the data block includes one or more fields.

19. The computer program product according to claim 17 wherein, in executing the second portion of the validation operation, the program code causes the at least one processing platform to analyze transaction data in a body of the data block to identify one or more issues with the transaction data.

20. The computer program product according to claim 17 wherein the party storage node sends the data block to be validated to the cloud storage node in response to the first consensus among the plurality of party storage nodes that the first portion of the validation operation has passed.

* * * * *